Patented Aug. 11, 1925.

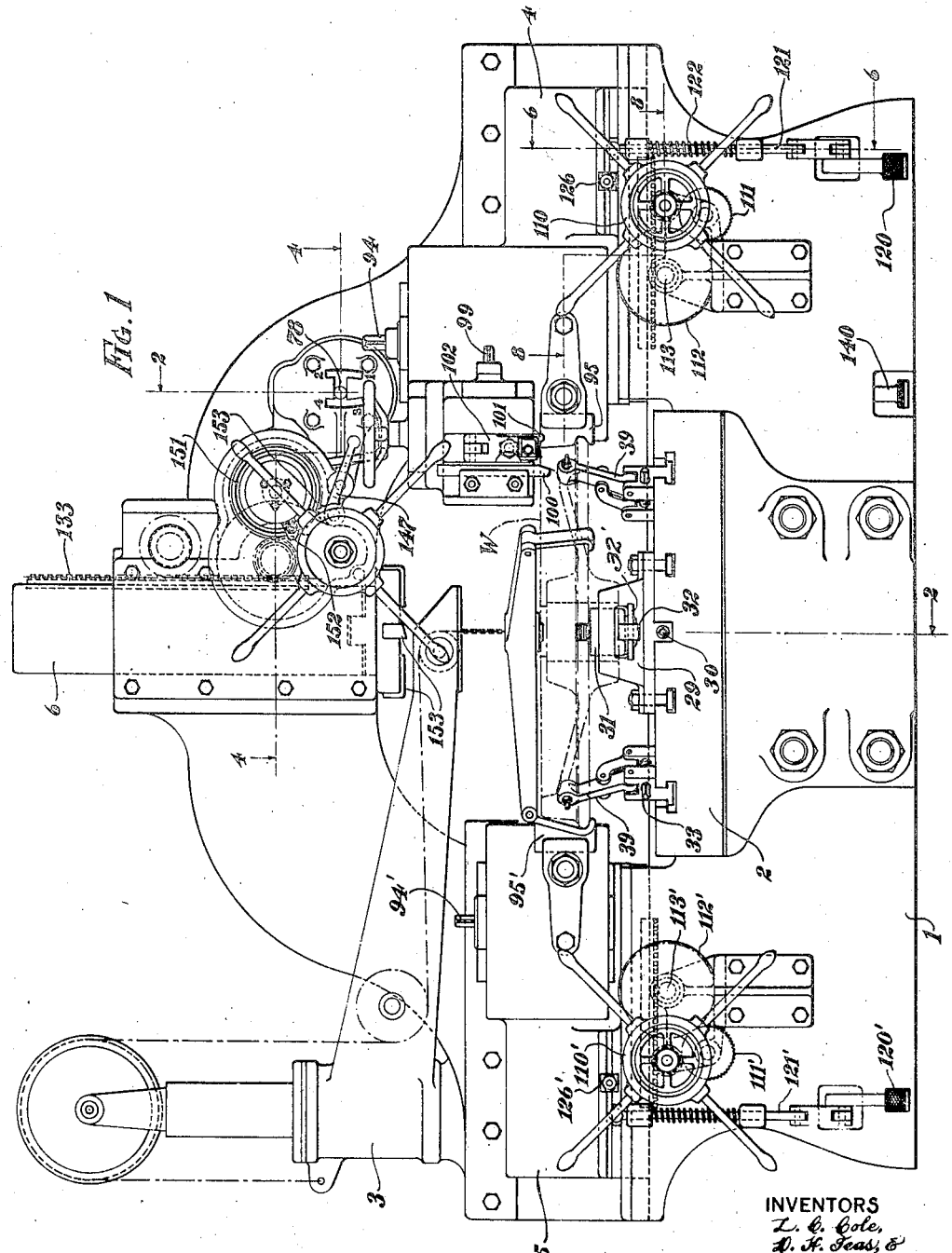

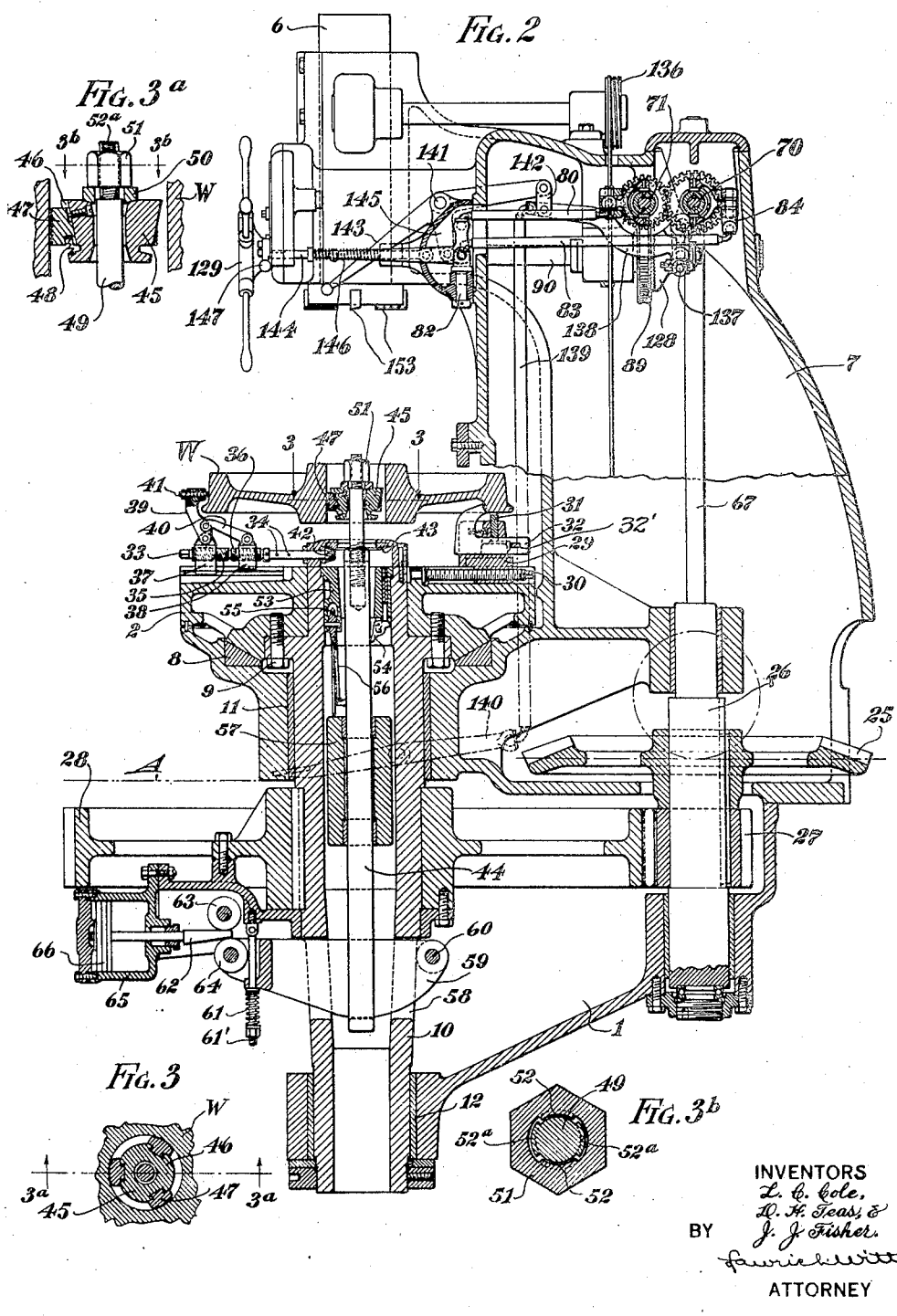

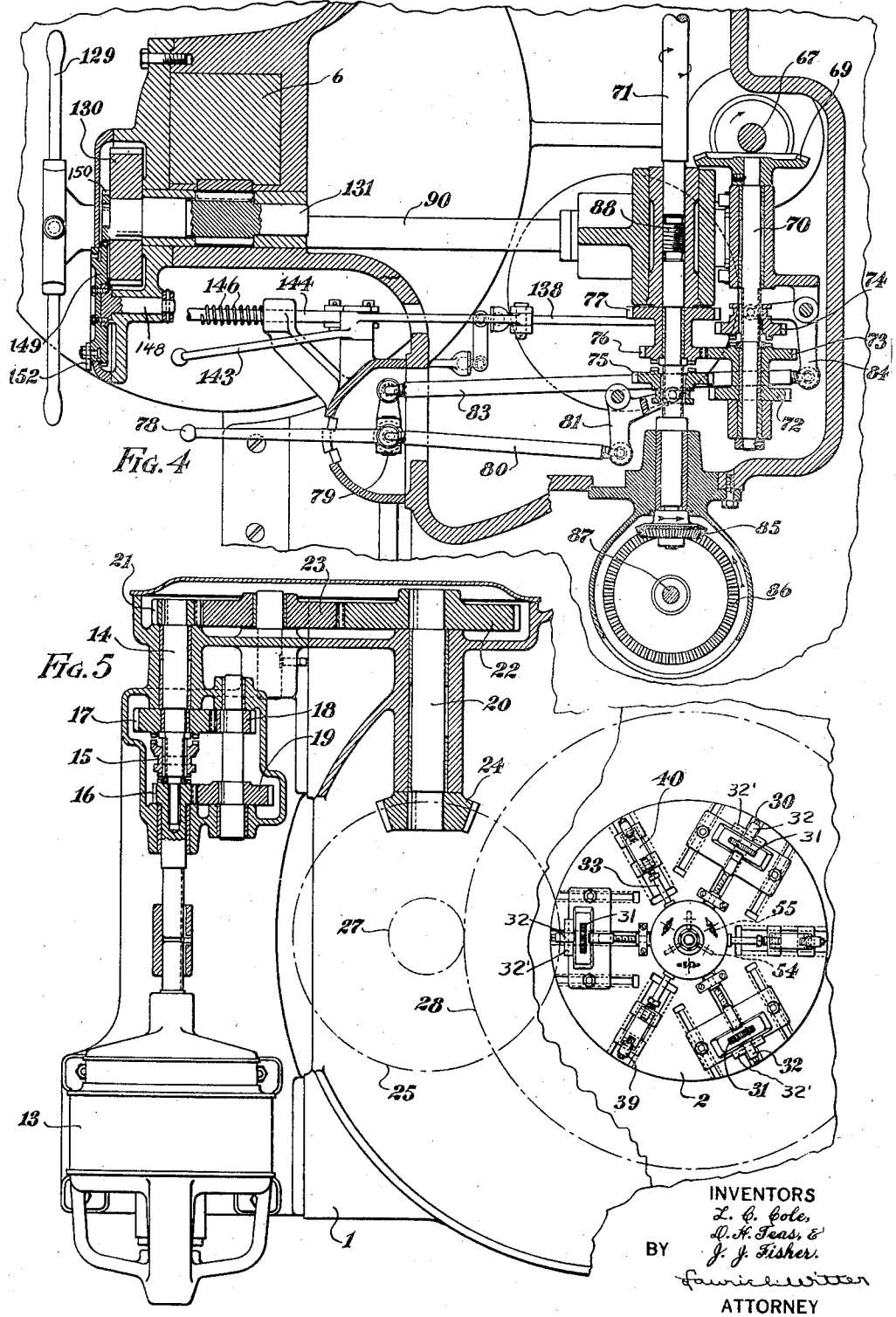

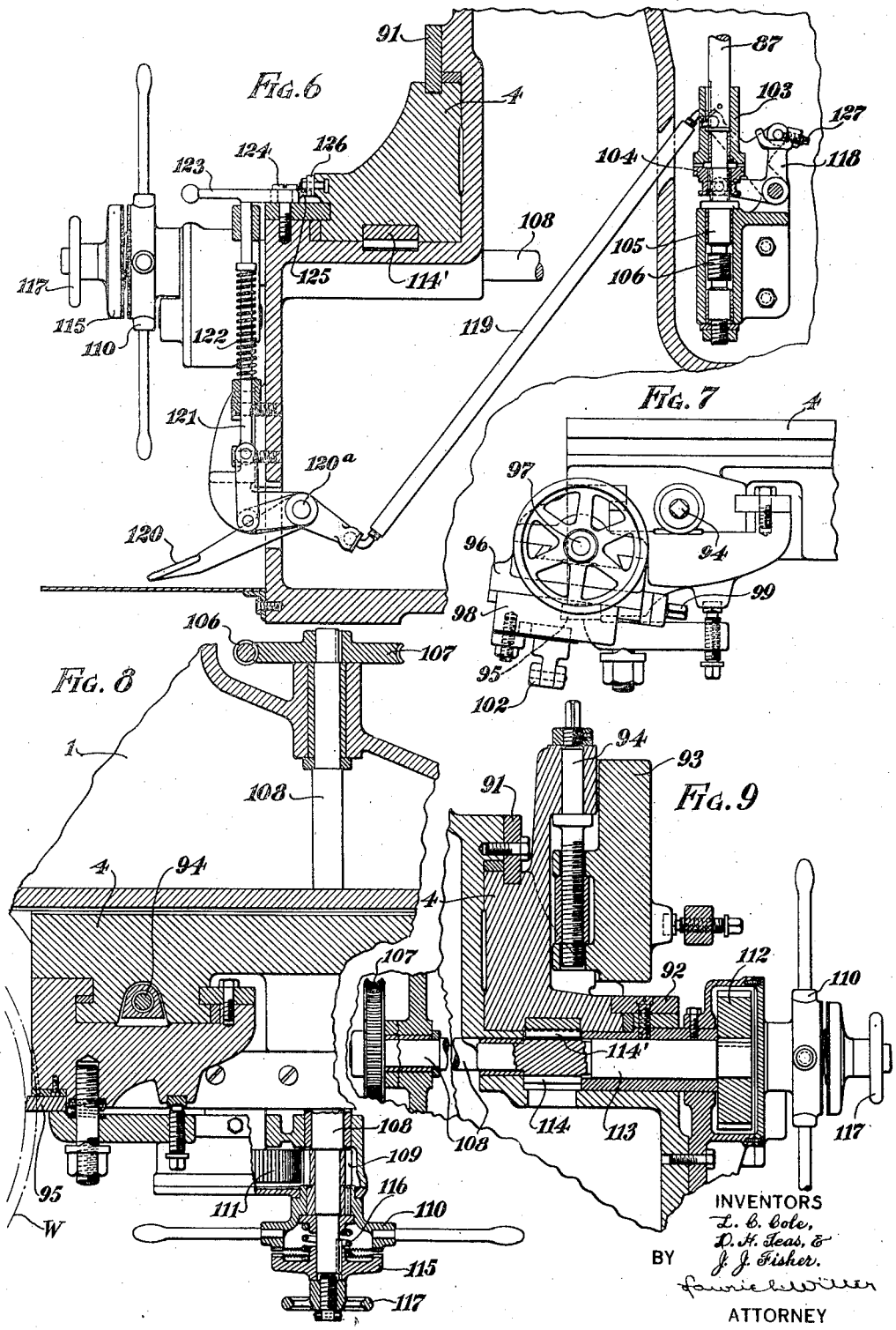

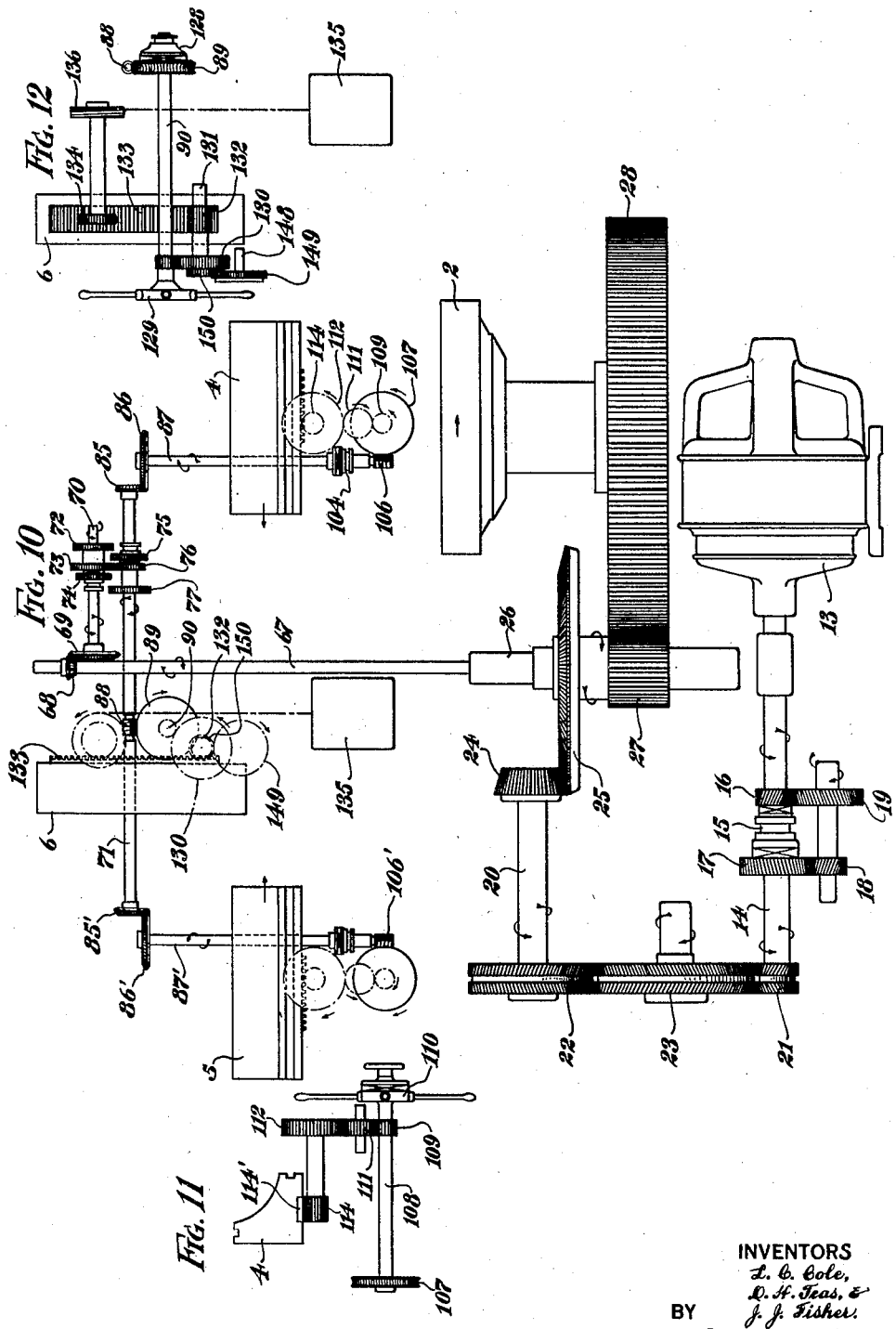

1,549,451

UNITED STATES PATENT OFFICE.

LYNDON C. COLE, OF HAMILTON, OHIO, DANIEL H. TEAS, OF CHICAGO, ILLINOIS, AND JOHN J. FISHER, OF HAMILTON, OHIO, ASSIGNORS TO NILES-BEMENT-POND COMPANY, OF NEW YORK, N. Y., A CORPORATION OF NEW JERSEY.

CAR-WHEEL LATHE.

Application filed April 22, 1922, Serial No. 556,024. Renewed February 17, 1925.

*To all whom it may concern:*

Be it known that we, LYNDON C. COLE, DANIEL H. TEAS, and JOHN J. FISHER, citizens of the United States, residing, respectively, at Hamilton, in the county of Butler and State of Ohio; at Chicago, in the county of Cook and State of Illinois; and at Hamilton, in the county of Butler and State of Ohio, have invented certain new and useful Improvements in Car-Wheel Lathes, of which the following is a specification.

This invention relates to machine tools and particularly to a vertical car wheel lathe of the type illustrated in the accompanying drawings. The machine, as illustrated, is particularly adapted for turning the contour of the tread and flange and facing the hub and rim on the side opposite the flange of rolled steel car wheels. The machine illustrated is adapted to perform these operations simultaneously. The primary object of the invention is to provide an improved machine for performing the functions stated.

It is an object of the invention to provide an improved work centering mechanism in connection with the work table of the machine whereby the work may be accurately centered before being clamped to the table.

It is another object of the invention to provide improved work securing means in connection with the work table and the driving dogs thereon, such means extending axially of the work table and being adapted to draw the work into tight engagement with the driving dogs on the table.

Another object of the invention is to provide a work engaging device comprising a bushing having a plurality of serrated jaws therein, the device being adapted to be mounted within a bore in a work piece with the jaws in engagement with the walls of such bore.

A further object of the invention is to provide an improved compound tool holder and improved means for operating the tool holder, such means including change speed mechanism and means for automatically and independently controlling the feed of such tool holder.

With the above and other objects in view, our invention consists in the features of construction and operation set forth in the following specification and illustrated in the accompanying drawings. In such drawings annexed hereto and forming a part of this specification, we have shown certain embodiments of our invention in a vertical car wheel lathe but it will be understood that the invention can be otherwise embodied and that the drawings are not to be construed as defining or limiting the scope of the invention, the claims appended to this specification being relied upon for that purpose.

Referring to the figures of the drawings:

Figure 1 is a front elevation of a vertical car wheel lathe comprising our invention.

Fig. 2 is a vertical sectional view therethrough approximately on line 2—2 of Fig. 1.

Fig. 3 is a cross sectional view through the work engaging device, taken on line 3—3 of Fig. 2.

Fig. 3ª is an enlarged longitudinal sectional view thereof on line 3ª—3ª of Fig. 3.

Fig. 3ᵇ is a cross section on line 3ᵇ—3ᵇ of Fig. 3ª.

Fig. 4 is a horizontal sectional view taken approximately on line 4—4 of Fig. 1.

Fig. 5 is a horizontal sectional view through the table drive gearing.

Fig. 6 is a vertical sectional view through one of the tool slides approximately on lines 6—6 of Fig. 1.

Fig. 7 is a plan view of the compound tool holder.

Fig. 8 is a fragmentary horizontal sectional view through such holder approximately on line 8—8 of Fig. 1.

Fig. 9 is a fragmentary vertical section thereof.

Fig. 10 is a diagrammatic view of the gearing and mechanism operated thereby.

Fig. 11 is a diagrammatic projection of the horizontal tool slide and its operating mechanism adjacent thereto in Fig. 10.

Fig. 12 is a diagrammatic projection of the vertical tool slide and its operating mechanism shown in Fig. 10.

A car wheel W of the type to be machined is illustrated in dot and dash lines as mounted on the work table shown in Fig. 1 of the drawings and in full lines in Fig. 2. The hub of the wheel has a hole punched therethrough and a minimum amount of stock is left in the bore and on the hub, tread and flange to permit the proper machining thereof. The wheel may first be bored and brought to the lathe in this condition whereby the wheel would be centered by the finished hole. We prefer, however, to eliminate this operation and have the wheels brought to the lathe directly as they come from the rolling mill. Our machine therefore is adapted to receive the wheel in the rough, to accurately center the same on the work table and to simultaneously machine the flange, tread, side and hub thereof.

Referring to the accompanying drawings, 1 indicates the bed of the machine having a work table 2 rotatably mounted thereon. A pneumatic hoist 3 is provided on the bed at one side thereof for lifting the work W onto the work table. Tool slides 4 and 5 are mounted for horizontal sliding movement on the bed at opposite sides of the table. A tool slide 6 is mounted for vertical sliding movement over the table in a forwardly projecting portion of an arch-shaped column 7 extending upwardly from the rear of the bed.

The bearing surface of the table or face plate 2 is conical and rests on a large annular ring 8. Bolts 9 secure the table to a vertical spindle 10 mounted in upper and lower bearings 11 and 12 in the bed 1. The table is rotated from a motor 13 through the mechanism illustrated in Figs. 2, 5 and 10. A shaft 14 in alignment with the motor shaft has a clutch 15 splined thereon. The shaft 14 may be driven directly from the motor shaft by engaging the clutch 15 with clutch teeth on the end of a gear 16 on the motor shaft. By shifting the clutch 15 in the opposite direction into engagement with clutch teeth on a loose gear 17, the shaft 14 may be driven at a slower speed through the back gears 18 and 19. A shaft 20 is driven from the shaft 14 through gears 21 and 22 on such shafts and an intermediate idler gear 23. A bevel pinion 24 on shaft 20 meshes with a large bevel gear 25 on a vertical shaft 26 at the rear of the machine. The table is driven from the shaft 26 through a pinion 27 on such shaft meshing with a large gear 28 keyed to the spindle 10.

The dot-and-dash line A represents the floor line. It will be noted that the spindle 10 extends above and below this line and its lower end is supported in the bearing 12. The large driving gear 28 is secured to the spindle directly below this line, the portion of the spindle between such gear and the work table 2 being relatively heavy. This gear is very heavy and preferably of a diameter considerably greater than that of the work table. By placing such gear beneath the floor A, a gear of any size desired may be used without in any way interfering with the operation of the machine. It will be understood that the work performed by this machine on rolled steel car wheels is extremely heavy and requires correspondingly heavy operating mechanism therefor, particularly for the table operating mechanism. The table rotating mechanism just defined is particularly adapted for such a machine.

The work table 2 is provided thereon with a plurality of work holding and driving members and a plurality (preferably three) of work centering devices, the centering devices being adapted to accurately center the work prior to its driving engagement with the members. Each driving member comprises a base 29 mounted for radial sliding movement in the table under the action of a screw 30. In each base 29 is mounted a serrated work engaging jaw 31 and a hook clamp 32 for engaging the interior of the work to prevent any lateral slipping thereof. A wedge key 32' is adapted to be driven through a hole in the body portion of each clamp 32 for drawing the clamp into engagement with the wheel W. As shown in Fig. 2, the work driving jaws 31 are adapted to bite the surface of the work facing the table and the work holding jaws 32 are adapted to engage a relatively angular surface of the work to hold the same against lateral movement. A work centering device is preferably arranged between each two adjacent driving jaws 31, as illustrated. Each such device comprises a rod 33 mounted radially and for rotation in the spindle 10. Each rod is provided with a plurality of spaced holes 34 therein whereby a sleeve mounted thereon may be secured to the rod in different positions therealong. Each sleeve has two sets of screw threads respectively on opposite ends thereof, one set 35 being of a much greater pitch than the other set 36. Nuts 37 and 38 are mounted respectively on the threaded portions 35 and 36. A work centering element proper 39 is pivoted to the nut 37 and a link 40 connects the element 39 with the nut 38. A work engaging bolt 41 is adjustably mounted in the free end of the element 39. A bevel pinion 42 on the inner end of each rod 33 meshes with a bevel ring gear 43 whereby the rotary adjustment of one of the rods adjusts all the rods simultaneously.

After the work has been properly centered on the table, the same must be held down vertically in contact with the driving jaws 31. For this purpose, we preferably provide a shaft 44 extending axially within the work support. A work engaging device adapted to be secured to the work is adapted to be engaged by the shaft and drawn downwardly to force the work into driving contact with the driving jaws. 45 indicates a conical bushing having three inclined guideways 46 therein in each of which is dovetailed a serrated work engaging jaw 47. Springs 48 are provided for holding the jaws at the high portions of their inclined guideways whereby the jaws are held in biting contact with the work as hereinafter described. The shaft 44 has an extension 49 threaded into the upper end thereof. A beveled aligning collar 50 and nut 51 are provided for securing the shaft to the bushing 45, the nut and extension 49 being provided respectively with cooperating interrupted threads 52 and 52$^a$ whereby the nut may be quickly mounted on and removed from the shaft.

A bushing 53 is secured axially within the spindle 10 and is provided with means for centering and counter-balancing the shaft 44. It will be noted that the shaft is floatingly mounted in the spindle. Three spring pressed pawls 54 are pivoted to the lower end of bushing 53 about the shaft, such pawls normally acting against the shaft to hold the same axially aligned in the spindle. Pulleys 55 are mounted in the bushing alternately between the pawls 54. A cord 56 extends over each pulley and has the opposite ends thereof respectively secured to the shaft 44 and to a counterbalance weight 57 slidably mounted on the shaft. By this mechanism, the shaft is normally held in a raised position centrally of the spindle 10.

Within a slotted portion 58 of the spindle, we mount an arm 59 pivoted on the spindle at 60. The free end of the arm is normally held in a raised position by means of a spring 61 on a stud 61'. The arm may be forced downwardly against the action of the spring by means of a wedge 62 operating between rollers 63 and 64 secured to the spindle and arm respectively. Fluid pressure means as the cylinder 65 and piston 66 is preferably provided for operating the wedge. It will be noted that the cylinder and other parts in connection therewith are secured to the spindle gear 28.

The shaft 26 is reduced at 67 and extends upwardly in the column to feed the tool slides heretofore referred to. A bevel pinion 68 on the upper end of shaft 67 meshes with a bevel gear 69 on a horizontal shaft 70 of the change speed mechanism. Such mechanism comprises a second and parallel shaft 71 and gears cooperating with gears on the shaft 70 (Figs. 4 and 10). The gearing on shaft 70 comprises two integral gears 72 and 73 loose on the shaft and a clutch gear 74 splined to the shaft. The gearing on the shaft 71 comprises two integral gears 76 and 77 loose on the shaft and a clutch gear 75 splined to the shaft. A controlling lever 78 operating in an H-slot at the front of the machine is provided for shifting the change speed gears. Lever 78 is pivoted on a horizontal axis 79 and vertical movement of the lever 78 thereabout operates through a rod 80 and bell crank lever 81 to shift the gear 75. Lever 78 is also mounted on a vertical pivot 82 and horizontal movement of the lever about such pivot operates through rod 83 and bell crank lever 84 to shift the gear 74. The adjacent faces of gears 74 and 73, as well as adjacent faces of gears 75 and 76, are provided with clutch teeth, as shown in Fig. 4. The shaft 71 may be driven from shaft 70 at any one of four speeds. With the lever 78 in the slots indicated at 1, 2, 3 and 4, in Fig. 1, the speed obtained will be from the lowest to the highest in the order indicated. With the lever in slot 1, gears 74 and 75 will both be shifted away from their respective adjacent gears 73 and 76 and the drive will be through gears 74, 77, 76, 73, 72 and 75. With the lever in slot 2, the gear 75 will be shifted into clutching engagement with the gear 76 and the drive will be through gears 74, 77 and 75. With the lever in slot 3, the gear 74 will be shifted into clutching engagement with the gear 73 and the drive will be through gears 74, 72 and 75. With the lever in slot 4, both gears 74 and 75 will be shifted respectively into clutching engagement with their adjacent gears 73 and 76 and the drive will be through gears 74, 73, 76 and 75.

The shaft 71 is adapted to feed both horizontal tool slides 4 and 5 and the vertical tool slide 6. A bevel pinion 85 on one end of shaft 71 meshes with a bevel gear 86 on the upper end of a vertical shaft 87 for feeding the tool slide 4. A like bevel pinion 85' on the other end of shaft 71 meshes with a like bevel gear 86' on the upper end of a like vertical shaft 87' for feeding the tool slide 5. The operating mechanism for tool slides 4 and 5 are the same and therefore a detailed description of one will suffice. A worm 88 on the shaft 71 meshes with a worm wheel 89 loose on a horizontal shaft 90 for feeding the vertical tool slide as hereinafter described.

The tool slide 4 broadly comprises a compound tool holder as is now to be described, such slide being supported for horizontal sliding movement on the bed by means of gibs 91 and 92. A tool holder 93 is vertically adjustable on the slide by means of a screw 94. This tool holder is adapted to carry a tool 95 having a contour corresponding to the tread of a finished car wheel. The forward portion of the tool holder 93 is provided with a vertical guideway on which is mounted for vertical adjustment a slide 96, a screw 97 being provided for adjusting such slide. A tool holder 98 is horizontally adjustable on the slide 96 by means of a screw 99. Tools 100 and 101 are secured to the holder 98 for respectively finishing the inner and outer portions of the wheel (Fig. 1). An auxiliary tool holder or bracket 102 is pivoted to the holder 98. This bracket carries a sharp tool at its free end and is adapted to be swung downwardly into position for cutting a wear line on the wheel or to be swung upwardly to an inoperative position when not in use. The slide 4 is operated automatically by power through the mechanism now to be described, the slide and tool holders on the slide 4 being adjustable by hand only.

The shaft 87 (Fig. 6) has pinned to its lower end one element 103 of a clutch, the movable element 104 thereof being splined to a coaxial shaft 105. A worm 106 on shaft 105 meshes with a worm wheel 107 on a horizontal shaft 108 extending forwardly beneath the slide 4. A pinion 109 is loosely mounted on this shaft and has keyed thereto a pilot wheel 110. The pinion meshes with an idler 111 which in turn meshes with a gear 112 keyed to a shaft 113. A pinion 114 on the inner end of shaft 113 meshes with a rack 114' secured to the slide 4. The slide may therefore be moved by hand through the pilot wheel 110. A clutch 115, engageable with the pilot wheel, is splined to the outer end of shaft 108, a spring 116 normally holding the clutch disengaged. A hand wheel 117 is threaded to the outer end of the shaft whereby the clutch may be forced into engagement with the pilot wheel when the slide is to be moved by power.

The power feed to the slide 4 may be disengaged by means of either clutch 104 or 115. The clutch 104 may be operated either automatically or by hand as follows (Fig. 6). One arm of an adjustable bell crank lever 118 engages the clutch 104. A rod 119 connects the other arm thereof to an arm of a foot pedal 120 pivoted at 120ᵃ. It will be seen that downward pressure of the pedal will engage the clutch. A third arm of the pedal is connected to a vertical rod 121 provided with a spring 122 thereon normally moving the rod upwardly to disengage the clutch. A lever 123 is pivoted to the bed at 124 in front of the slide 4. This lever may be positioned over the rod thereby preventing upward movement thereof. The lever is provided with a heel 125 in the path of movement of a dog 126 adjustable on the slide 4. In operation, the clutch 104 may be closed by means of the foot pedal 120 and held in such position by positioning the lever 123 over the rod whereby the slide 4 will be fed until the lever is moved therefrom by the contact of the dog 126. Such movement of the lever permits the spring 122 to move the rod upwardly and disengage the clutch. The extent of feed of the slide 4 depends upon the position of the dog 126 thereon. The engagement of the clutch may be accurately adjusted by manipulating the adjusting screw 127.

The feeding movement of the vertical slide 6 is controlled by mechanism similar to that just described. The worm wheel 89 is loosely mounted on the horizontal shaft 90 and may be operatively connected thereto by means of a clutch 128 splined to the shaft. A pilot wheel 129 is mounted on the forward end of shaft 90 for rotating the same. Such rotation is adapted to move the slide 6 vertically through a pinion on shaft 90 meshing with a gear 130 on a shaft 131 provided with a pinion 132 in mesh with a rack 133 on the slide. The weight of the slide is counterbalanced by means of a pinion 134 meshing with the rack and normally rotated in the slide raising direction by means of a weight 135 acting on a wheel 136 secured to the pinion shaft.

The vertical movement of the slide 6 may be automatically or hand controlled through the clutch 128 as follows. A yoke 137 for moving the clutch is provided with an operating lever 138 (Fig. 2). A rod 139 connects this lever with a foot pedal 140 whereby the clutch may be closed by pushing the pedal downwardly in the manner heretofore described in reference to the slide 4. A second lever pivoted at 141 has its inner end connected to the lever 138 at 142, the outer end 143 of such lever serving as a hand operating means therefor. A sliding rod 144 has its inner end connected to a third arm 145 of the said second lever. A spring 146 on the rod normally forces the same outwardly thereby opening the clutch 128 and stopping the feed. A pivoted lever 147 may be moved about its pivot to extend over the rod and thereby hold the clutch in engagement against the action of spring 146. A stub shaft 148 supports a gear 149 thereon in mesh with a gear 150 on the pinion shaft 131. The gear 149 has an annular T-slot 151 in its front face for adjustably receiving a dog 152 therein. This dog is adapted to engage with a heel 153 on the lever 147 and such engagement is adapted to move the lever and permit the rod 144 to move outwardly and disengage the clutch 128. The gear 149 is synchronously connected with the slide 6 and therefore the position of the dog 152 in the T-slot 151 determines the extent of feeding movement of the vertical slide 6.

It is believed that the operation of the machine will be clearly understood from the above without further description herein. Briefly, the rough car wheel W comprising the work piece is placed near the lathe. The bushing 45 is placed in the bore of the wheel which is then lifted to the table by means of the hoist 3, the bushing being passed over the extension 49 of the shaft 44. The wheel is then centered by the centering devices 39 in the manner heretofore described. The nut 51 and collar 50 being secured to the shaft 44 over the bushing 45, fluid is admitted to the cylinder 65 to draw the shaft 44 downwardly and the work therewith into driving engagement with the members 31 of the driving dog. The wheel now being centered and secured to the work support, power is applied to rotate the same from the motor 13.

The tool holders being properly adjusted and having the tools properly secured therein, also the dogs 126, 126' and 152 having been adjusted to positions to stop the tool feeds at the desired points, power feed is imparted to the tool slides by depressing pedals 120, 120' and 140. Depression of such pedals throws in the clutches 104, 104' and 128 heretofore described, such clutches being held in engagement by levers 123, 123' and 147 until automatically disengaged by dogs 126, 126' and 152 at the end of the tooling operation of each tool slide. The tools 95 and 95' on slides 4 and 5 operate on the rim portion of the wheel as has been heretofore described, while the tool slide 6 moves vertically downward to face off the hub of the wheel by tools 153, all such operations being performed simultaneously. Also as above described, the tool slide 4 adjustably supports tools 100, 101 and 102 thereon for performing certain finishing operations on the wheel.

What we claim is:

1. In a machine tool, the combination of a tool slide, means for feeding the slide, a clutch to the rear of the slide for controlling such feeding movement, manually operable means at the front of the machine, a link connecting such means with the clutch whereby the means may be operated to move the clutch to operative position, and automatic adjustable means in connection with the slide for moving the clutch to inoperative position at a predetermined point in the feeding movement.

2. In a machine tool, the combination of a tool slide, means for feeding the slide, a clutch for controlling such feeding movement, a foot pedal at the front of the machine operatively connected to the clutch for moving the latter to operative position, and automatic adjustable means in connection with the slide for moving the clutch to inoperative position at a predetermined point in the feeding movement.

3. In a machine tool, the combination of a tool slide, means for feeding the slide, a clutch for controlling such feeding movement, manually operable means at the front of the machine operatively connected to the clutch for moving the latter to operative position, a rod operatively connected to the clutch, a spring on the rod normally acting to disengage the clutch, means for holding the rod in a clutch engaged position, and means in connection with the slide for moving the last mentioned means from its rod holding position at a predetermined point in the feeding movement.

4. In a machine tool, the combination of a rotary work table, a tool slide at one side thereof, a tool slide over the table, tool slide feeding means comprising change speed mechanism at the rear of the table and an operative connection from such mechanism to each tool slide, means for automatically and independently controlling the feeding movement of each tool slide, and means at the front of the machine for controlling the change speed mechanism.

5. In a machine tool, the combination of a rotary work table, two tool slides at opposite sides thereof, a tool slide over the table, tool slide feeding means comprising change speed mechanism at the rear of the table, an operative connection from such mechanism to each tool slide, and automatic means for independently controlling the feed of each tool slide.

6. In a machine tool, the combination of a rotary work table, means for rotating the table, a tool slide at one side thereof, a tool slide over the table, a vertically extending shaft at the rear of the machine operatively connected to the table rotating means, a change speed mechanism operated by such shaft, an operative connection from such mechanism to each tool slide, automatic means for independently controlling the feed of each tool slide, and means at the front of the machine for controlling the change speed mechanism.

7. In a machine tool, the combination of a rotary work table, means for rotating the table, two tool slides at opposite sides thereof, a tool slide over the table, a vertically extending shaft at the rear of the machine operatively connected to the table rotating means, a change speed mechanism operated by such shaft, an operative connection from such mechanism to each of the said two tool slides and including a vertically extending shaft at each side of the machine, an operative connection from such mechanism to the other tool slide and including a shaft extending horizontally toward such tool slide, and automatic means for independently controlling the feed of each tool slide.

8. The combination of a horizontal tool slide, means for vertically adjustably supporting a turning tool thereon, an auxiliary slide vertically adjustable on the first slide, a tool holder horizontally adjustable on the vertical slide, and means on the tool holder for supporting a plurality of turning tools.

9. The combination of a horizontal tool slide, means for vertically adjustably supporting a turning tool thereon, an auxiliary slide vertically adjustable on the first slide, a tool holder horizontally adjustable on the vertical slide, means on the tool holder for supporting a plurality of turning tools, and an auxiliary tool holder mounted on the first holder and adapted to be adjusted either to an operative or an inoperative position.

10. The combination of a horizontal tool slide, means for vertically adjustably supporting a turning tool thereon, an auxiliary slide vertically adjustable on the first slide, a tool holder horizontally adjustable on the vertical slide, means on the tool holder for supporting a plurality of turning tools, and an auxiliary tool holder pivoted to the first holder and adapted to be swung either to an operative or an inoperative position.

11. The combination of a tool slide, a tool holder adjustable thereon at right angles to the movement of the slide, an auxiliary slide adjustable on the tool holder, a second tool holder adjustable on the auxiliary slide at right angles to the adjustment of such slide, and means on the second tool holder for supporting a plurality of turning tools.

12. The combination of a horizontal tool slide, a tool holder vertically adjustable thereon, an auxiliary slide vertically adjustable on the tool holder, a second tool holder horizontally adjustable on the auxiliary slide, and means on the second tool holder for supporting a plurality of turning tools.

13. A car wheel finishing machine comprising the combination of a rotary work table, a base rotatably supporting the table and extending beyond the table at opposite sides thereof, a tool slide mounted for horizontal sliding movement on each extended portion of the base, a formed tool supported on each slide adjacent the table, a frame extending upwardly from the base and over the table, a vertically sliding tool slide supported in the frame over the table, and power means for rotating the table and actuating the tool slides.

14. A car wheel finishing machine comprising the combination of a rotary work table, a base rotatably supporting the table and extending beyond the table at opposite sides thereof, a tool slide mounted for horizontal sliding movement on each extended portion of the base, a formed tool supported on each slide adjacent the table, an arch-like frame extending upwardly from the extended portions of the base and projecting over the table, a vertically sliding tool slide supported in the frame axially over the table, and power means for rotating the table and actuating the tool slides.

15. A car wheel finishing machine comprising the combination of a rotary work table, a base rotatably supporting the table and extending beyond the table at opposite sides thereof, a tool slide mounted for horizontal sliding movement on each extended portion of the base, a formed tool supported on each slide adjacent the table, a frame extending upwardly from the base and over the table, a vertically sliding tool slide supported in the frame over the table, power means for rotating the table and actuating the tool slides, and a work carrying crane pivotally supported on one of the extended portions of the base and adapted to pivot thereabout to carry a car wheel to and from the table.

16. A car wheel finishing machine comprising the combination of a rotary work table, a base rotatably supporting the table and extending beyond the table at opposite sides thereof, a tool slide mounted for horizontal sliding movement on each extended portion of the base, a formed tool supported on each slide adjacent the table, a frame extending upwardly from the base and over the table, a vertically sliding tool slide supported in the frame over the table, power means for automatically feeding the tool slides as the table rotates, and means for automatically stopping the feeding movement of the slides at the end of a predetermined movement thereof.

17. A car wheel finishing machine comprising the combination of a base, a rotary work table supported in bearings therein, a pair of tool slides mounted for horizontal sliding movement respectively at opposite sides of the table, a formed tool supported on each slide adjacent the table, a frame extending upwardly from the base and over the table, a vertically slidable tool slide supported in the frame over the table, a vertically extending shaft supported in bearings in the base adjacent the table bearings, an operative connection from the shaft to the table, an operative connection from an upwardly extending portion of the shaft to the tool slides, and means for rotating the shaft whereby to rotate the table and actuate the tool slides.

18. A car wheel finishing machine comprising the combination of a base, a rotary work table thereon, a pair of tool slides mounted for horizontal sliding movement respectively at opposite sides of the table, a formed tool supported on each slide adjacent the table, a frame extending upwardly from the base and over the table, a vertically slidable tool slide supported in the frame over the table, a motor in the base, a vertical shaft driven from the motor, and operative connections from the shaft to rotate the table and actuate the tool slides.

19. A car wheel finishing machine comprising the combination of a base, a rotary work table thereon, a pair of tool slides mounted for horizontal sliding movement respectively at opposite sides of the table, a formed tool supported on each slide adjacent the table, a frame extending upwardly from the base and over the table, a vertically slidable tool slide supported in the frame over the table, a vertically extending shaft adjacent the table, an operative connection from the shaft to the table, means for rotating the shaft, the shaft extending upwardly within the frame, and means including change speed gearing within the upper portion of the frame for operating the tool slides from the shaft.

20. A car wheel finishing machine compring the combination of a base, a rotary work table thereon, a pair of tool slides mounted for horizontal sliding movement respectively at opposite sides of the table, a formed tool supported on each slide adjacent the table, a frame extending upwardly from the base and over the table, a vertically slidable tool slide supported in the frame over the table, a vertically extending shaft adjacent the table, an operative connection from the shaft to the table, means for rotating the shaft, the shaft extending upwardly within the frame, means including change speed gearing and a clutch for each tool slide for operatively connecting the tool slides with the shaft, and automatic stop means cooperating with each slide and its clutch for disengaging the latter after a predetermined feeding movement of the slide.

21. In a machine tool, the combination of a frame, a rotary spindle mounted vertically therein and extending above and below the floor line, a work table secured to the spindle above the floor line, a relatively large gear secured to the spindle below the floor line, and a driving gear meshing with the large gear below the floor line.

22. In a machine tool, the combination of a frame, a rotary spindle mounted vertically therein and extending above and below the floor line, a relatively heavy gear secured to the spindle below the floor line, the gear being of a diameter greater than the diameter of the work table, and a driving pinion meshing with the gear below the floor line.

23. In a machine tool, the combination of a frame, a rotary spindle mounted vertically in bearings therein and extending above and below the floor line, one of the bearings being above the floor line and the other bearing being below the floor line, a work table secured to the spindle above the upper bearing, a relatively large gear secured to the spindle below the floor line and above the lower bearing, and a driving gear meshing with the large gear below the floor line.

24. In a machine tool, the combination of a frame, a rotary spindle mounted vertically therein and extending above and below the floor line, a work table on the frame and secured to the spindle above the floor line, a relatively large gear secured to the spindle directly below the floor line, and a driving pinion meshing with the gear below the floor line.

25. In a machine tool, the combination of a frame, a rotary spindle mounted vertically therein and extending above and below the floor line, a work table secured to the spindle above the floor line, a relatively large gear secured to the spindle below the floor line, a driving gear meshing with the large gear below the floor line, tool supports on the frame, and means connected to the pinion for operating the tool supports.

26. In a machine tool, the combination of a frame, a rotary spindle mounted vertically therein and extending above and below the floor line, a work table secured to the spindle above the floor line, a relatively large gear secured to the spindle below the floor line, a driving gear meshing with the large gear below the floor line, a vertically extending shaft in the frame, power means connected to the shaft for driving the same, a pinion on the shaft in mesh with the large gear, tool supports on the frame, and means driven by the said vertical shaft for operating the tool supports.

27. In a machine tool, the combination of a base having a downwardly extending portion and an upwardly extending column, a rotary spindle mounted vertically in bearings in the base and the downwardly extending portion thereof, a work table secured to the spindle above the uppermost bearing, a relatively large gear secured to the spindle below the uppermost bearing and above the lowermost bearing, the spindle between the gear and table being relatively heavy, a driving pinion meshing with the gear, and a tool support on the column adjacent the work table.

In testimony whereof, we hereto affix our signatures.

LYNDON C. COLE.
JOHN J. FISHER.
DANIEL H. TEAS.